(12) United States Patent  (10) Patent No.: US 7,788,337 B2
Flinchem et al.  (45) Date of Patent: Aug. 31, 2010

(54) SYSTEMS AND METHODS FOR ADVERTISEMENT TRACKING

(76) Inventors: Edward P. Flinchem, 121 W. Prospect St., Seattle, WA (US) 98119; William L. Valenti, 3824 48th Ave. NE., Seattle, WA (US) 98105

( * ) Notice: Subject to any disclaimer, the term of this patent is extended or adjusted under 35 U.S.C. 154(b) by 833 days.

(21) Appl. No.: 11/613,811

(22) Filed: Dec. 20, 2006

(65) Prior Publication Data
US 2007/0150606 A1  Jun. 28, 2007

Related U.S. Application Data

(60) Provisional application No. 60/752,540, filed on Dec. 21, 2005.

(51) Int. Cl.
*G06F 15/16* (2006.01)
*G06F 9/44* (2006.01)
*G06F 7/00* (2006.01)
*G06Q 30/00* (2006.01)

(52) U.S. Cl. ............................ 709/217; 705/7; 705/14; 707/104.1

(58) Field of Classification Search ....................... None
See application file for complete search history.

(56) References Cited

U.S. PATENT DOCUMENTS

2002/0165773 A1* 11/2002 Natsuno et al. ............... 705/14
2003/0096625 A1* 5/2003 Lee et al. ..................... 455/466
2003/0097374 A1* 5/2003 Himeno .................. 707/104.1
2005/0138633 A1* 6/2005 Barsade et al. .............. 719/313

* cited by examiner

*Primary Examiner*—Wen-Tai Lin

(57) ABSTRACT

Systems and methods for recording viewing of an advertisement on a mobile computing device. In an example method the mobile computing device initiates presentation of a digital content file having one or more associated advertisements, transmits from the mobile computing device at least one of an identifier for the presented digital content file or an identifier of the associated advertisement over a wireless network to a server, and updates an advertisement impression count at the server based on the transmitted digital content file identifier or associated advertisement identifier. The digital content file and associated one or more advertisement may be received from another mobile computing device. The mobile computing devices include cellular phones.

22 Claims, 5 Drawing Sheets

SYSTEMS AND METHODS FOR ADVERTISEMENT TRACKING

PRIORITY CLAIM

This invention claims the benefit of U.S. Provisional Application Ser. No. 60/752,540 filed Dec. 21, 2005, the contents of which are hereby incorporated by reference.

FIELD OF THE INVENTION

This invention relates generally to advertising and, more specifically, to recording viewing of advertisements over electronic devices.

BACKGROUND OF THE INVENTION

In a television broadcast medium, ratings of shows (proximate number of viewers) presents a determination of how to value advertisements that are associated with a given show. A determination is made as to approximately how many people will be viewing an advertisement. This correlates to how to value the time slot for an advertisement.

In the digital communications market where advertisements are delivered with digital content, there does not exist such a valuation system. It can be easily determined if a person has received an advertisement associated with digital content just by the recordation of the digital content transmission. This would apparently be easy to measure on a one time download basis, but cannot measure how many times a user may view the particular advertisement or whether other people are viewing the advertisement due to the fact that the recipient forwards the digital content with the associated advertisement to another user.

Therefore, there exists a need for more effectively evaluating viewership of advertisements associated with digital content over nontraditional delivery means.

SUMMARY OF THE INVENTION

The present invention provides systems and methods for recording viewing of an advertisement on a mobile computing device. In an example method the mobile computing device initiates presentation of a digital content file having one or more associated advertisements, transmits from the mobile computing device at least one of an identifier for the presented digital content file or an identifier of the associated advertisement over a wireless network to a server, and updates an advertisement impression count at the server based on the transmitted digital content file identifier or associated advertisement identifier.

In one aspect of the invention, it is determined if the digital content file is being played for a first time on the mobile computing device and if it is determined that the initiated digital content file is being played for the first time, the transmission and updating are performed.

In another aspect of the invention, the digital content file and associated one or more advertisements are received from another mobile computing device. The mobile computing devices include cellular phones.

In still another aspect of the invention, the advertisement impression count includes information associated with the mobile computing device that performed the transmission. The information includes at least one of location, type of device, or account information associated with the mobile computing device.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

The present invention includes a client-server solution that tracks ad impressions generated by peer-to-peer file sharing where ads are inside the shared content.

Figure 1:
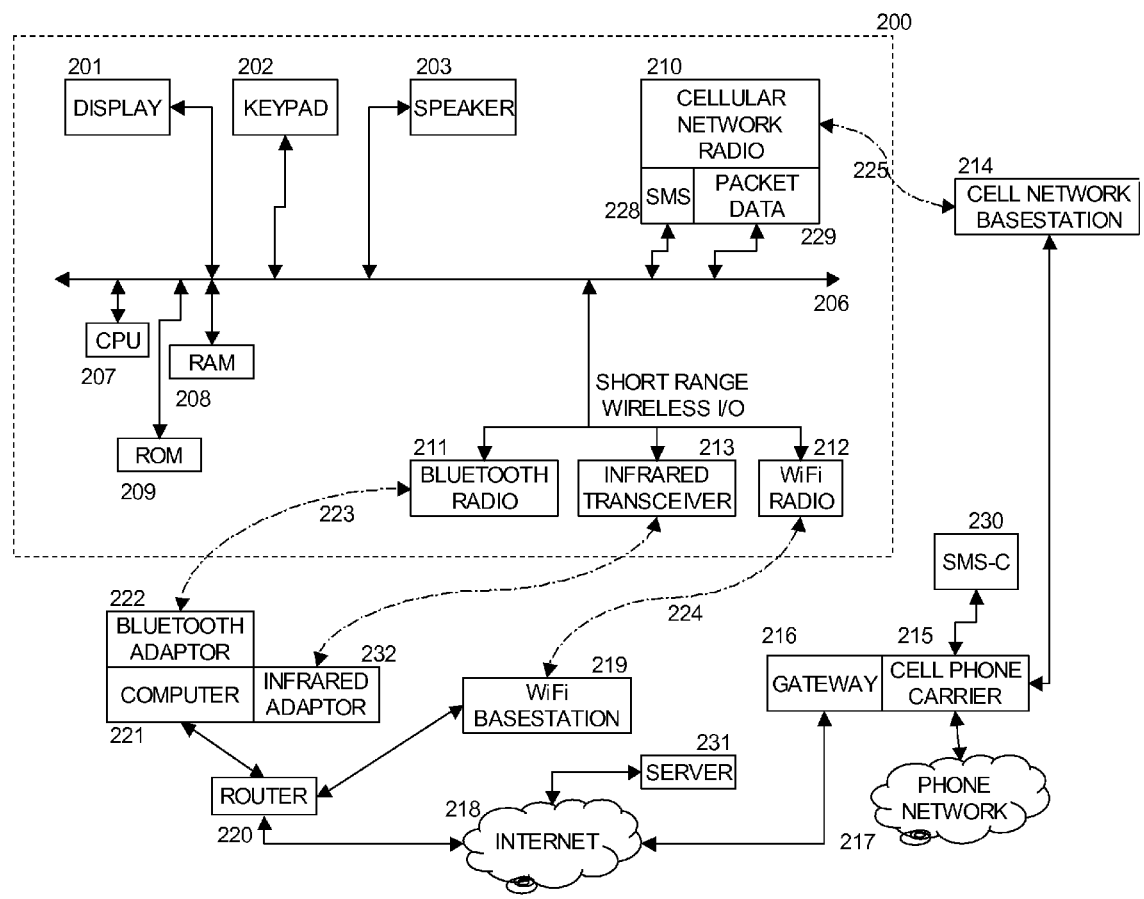
FIGS. 1 and 2 are schematic diagrams of example systems formed in accordance with embodiments of the present invention.

FIG. 1 shows a user device 200, such as a mobile phone, having a processor 207, random access memory 208, persistent memory 209 (which could be rewriteable FLASH memory), a display 201, a keypad 202, one or more speakers 203, and a cellular network radio data communication component 210. The radio component 210 allows data communications with a public or private data network 218 such as the Internet via cellular wireless voice and data network base stations 214, associated mobile phone carrier 215 and a gateway 216. The radio component 210 sends and receives a variety of packet data 229 according to a predefined protocol (UDP, TCP, SMTP, HTTP, etc) through the data network 218.

Via network 217, the device 200 may communicate to other mobile devices such as computers 221 and servers 231 via the network 218. The radio 210 sends and receives both Short Message Service (SMS) messages 228 or similar messages through the phone network 217 to other devices identified by their phone numbers and sends a variety of packet data 229 through the data network 218 via a predefined protocol (UDP, TCP, SMTP, HTTP, etc).

In one embodiment, a variety of short-range wireless communication interfaces include Bluetooth radio 211, Wireless Fidelity (WiFi) radio 212, or an infrared transceiver 213. The Bluetooth radio 211 allows communication via a short-range microwave link 223 (10 s of meters) with Bluetooth adaptors 222 connected to computers 221 and by extension through them via a router 220 to other devices on the public or private data network 218. The Bluetooth radio 211 is able also communicate directly to other similarly enabled mobile phones WiFi radio 212 provides communication via short-range microwave links 224 (10 s-100 s of meters) WiFi base stations 219 connected via the router 220, which may be incorporated into the 219, to the public or private data network 218. The WiFi radio 212 allows communication directly to other similarly enabled mobile phones.

The infrared transceiver 213 allows communication with infrared adaptors 232 connected to computers 221 and by extension through them via the router 220 to other devices on the public or private data network 218. The infrared transceiver 213 also allows communication directly to other similarly enabled mobile phones.

The server complex 231 enables the download of protected (encrypted) digital media files to the device 200 and digital content keys to unlock the protected content for use on devices properly authenticated.

Connected to the cell phone carrier 215 is a short message service center 230 (SMS-C) that enables transmission of messages between phones routed by their phone number and between the server complex 231 and phones.

Figure 2:
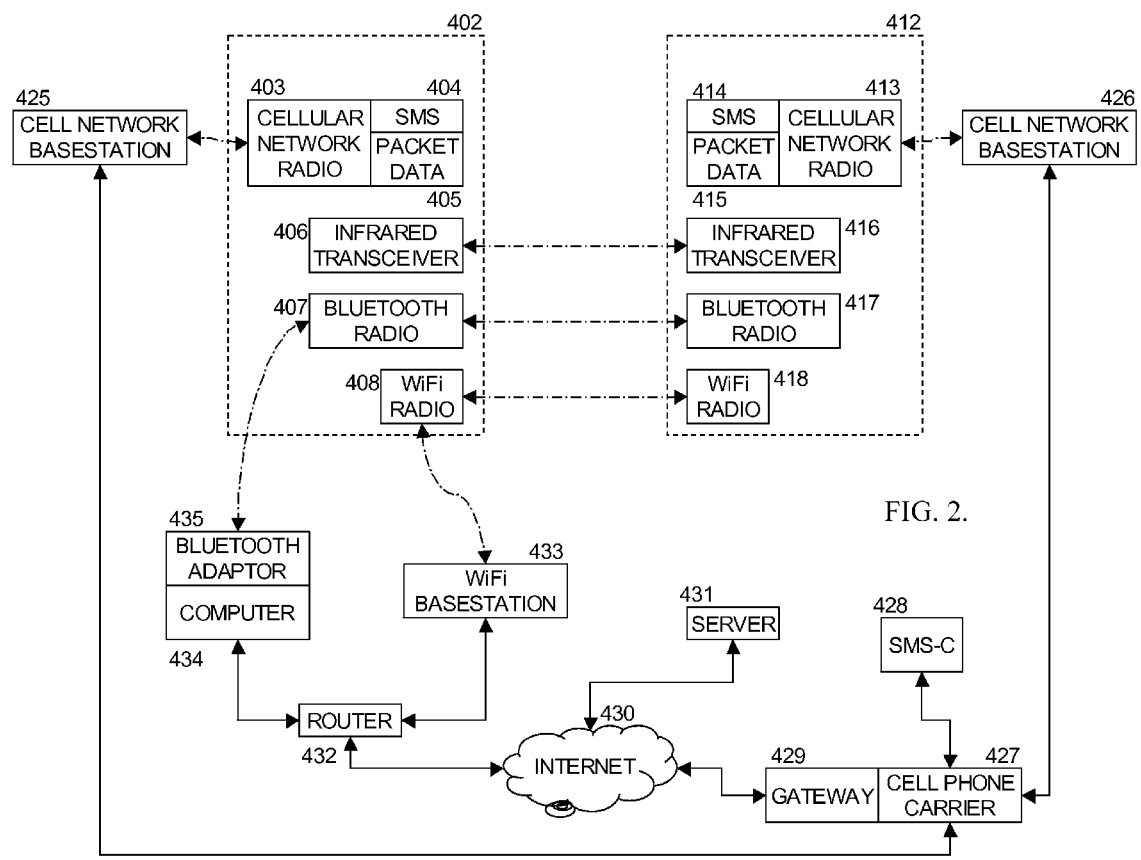

As shown in FIG. 2, devices 402 and 412 (e.g. mobile phones) are equipped with cellular network radios 403, 413 that are connected to SMS 404, 414 or packet data 405, 415 components. The radios 403, 413 communicate with their associated mobile phone carrier 427 and onward through a gateway 429 to a public or private data network 430 such as the Internet via a cellular wireless voice and data network basestations 425, 426. The devices 402, 412 communicate to each other and to other mobile phones and other devices such as a computer 434 and a server 431 via the data network 430.

The radios 403, 413 send and receive both SMS messages 404, 414 through the phone carriers 427 to other phones/devices identified by their phone numbers/identifiers and send a variety of packet data 405, 415 according to a protocol (such as UDP, TCP, SMTP, HTTP, etc) through the data network 430.

In one embodiment, the devices 402, 412 include at least one of a variety of short-range wireless communication interfaces, including Bluetooth radios 407, 417, WiFi radios 408, 418, and infrared transceivers 406, 416. The Bluetooth radio 407 may communicate with Bluetooth adaptors 435 connected to computers 434 and by extension through them via a router 432 to other devices on the public or private data network 430. The Bluetooth radio 407 is able also communicate directly to other similarly enabled devices.

WiFi radio 408 is able to communicate with WiFi base stations 433 connected via the router 432 (which may be incorporated into 433 to the public or private data network 430. WiFi radio 408 may also communicate directly to other similarly enabled devices 412.

The infrared transceiver 406 may communicate with infrared adaptors (not shown) connected to computers and by extension through them via the router 432 to other devices on the public or private data network 430. The infrared transceiver 406 may also communicate directly to other similarly enabled devices.

Connected to the data network 430 is the server complex 431 that enables the download of protected (encrypted) digital media files to the devices 402, 412 and digital content keys to unlock the protected content for use on devices properly authenticated. Connected to the cell phone carrier 427 is an SMS-C 428 enabling transmission of messages between phones routed by their phone number.

Figure 3:
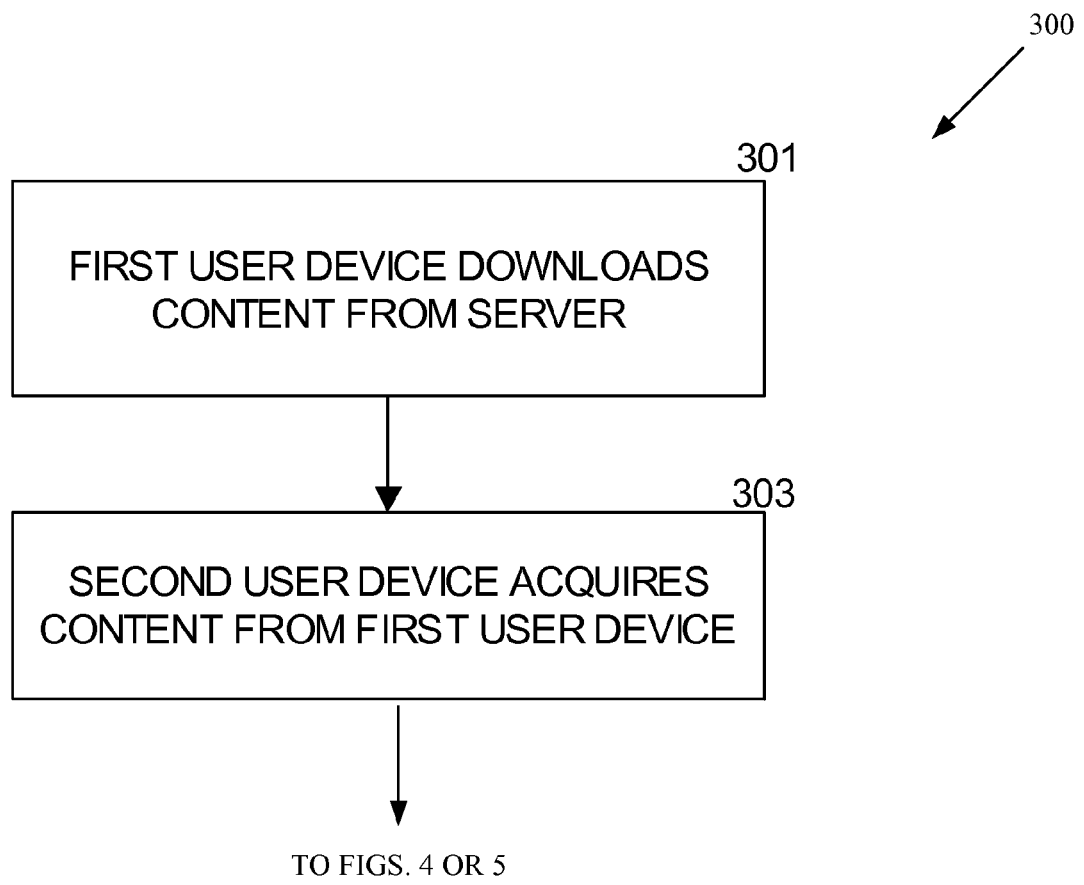
FIGS. 3-5 are flowcharts of example methods performed by the systems shown in FIGS. 1 and 2.

FIG. 3 illustrates an example process 300 performed by the system shown in FIG. 1. At block 310, a first user device (e.g. device 402) downloads content from the server 431. At block 303, a second user device (e.g. device 412) acquires the content from the first user device. After block 303, the process 300 continues on to the process shown in FIGS. 4 or 5.

Figure 4:
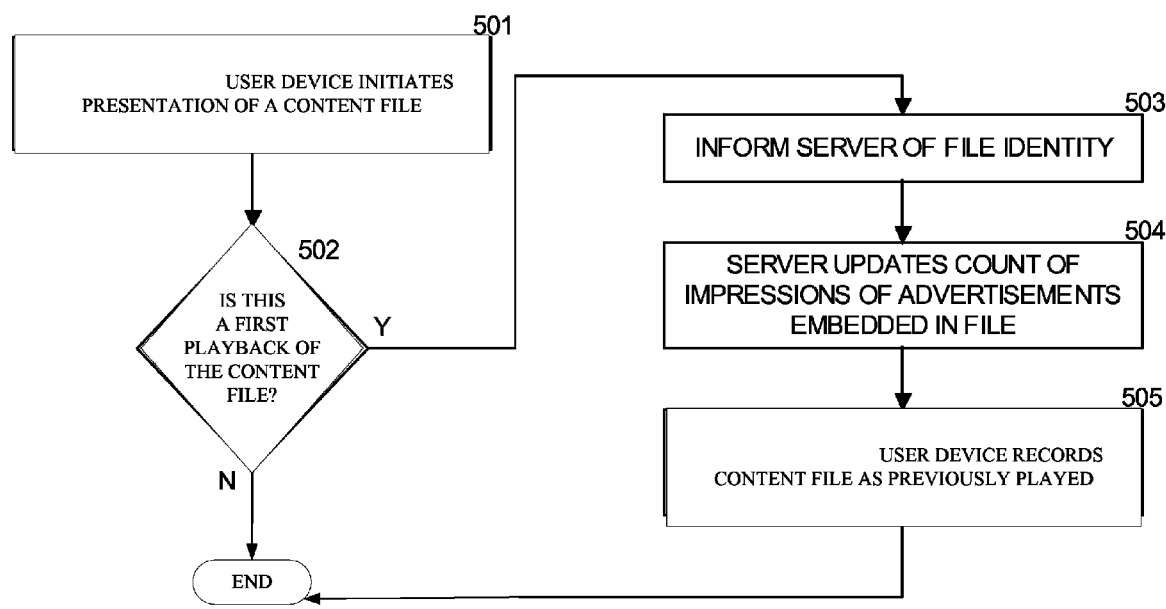

FIG. 4 shows an example process 500 performed after the process 500 shown in FIG. 3. At block 501, a user device initiates presentation of a content file. At block 502, the processor of the user device determines if this is a first playback of the initiated content file. If it is a first playback, then at block 503, the user device informs the server of the identity of the file that is/was played. At block 504, the server updates a count of impressions of advertisements embedded in or associated with the played content file. In another embodiment, the server updates or records other information, such as location of the user device, type of user device, account information associated with the owner of the user device, or any other information that is useful to provide an advertiser or someone who is assigning a value to an advertisement. At block 505, the user device records the content file as previously played. Thus, FIG. 4 shows a process for recording when a user plays an advertisement associated with a content file at the first time it is presented to a user and not at subsequent times. The counts recorded at the server are used to give value to the advertisements.

Figure 5:
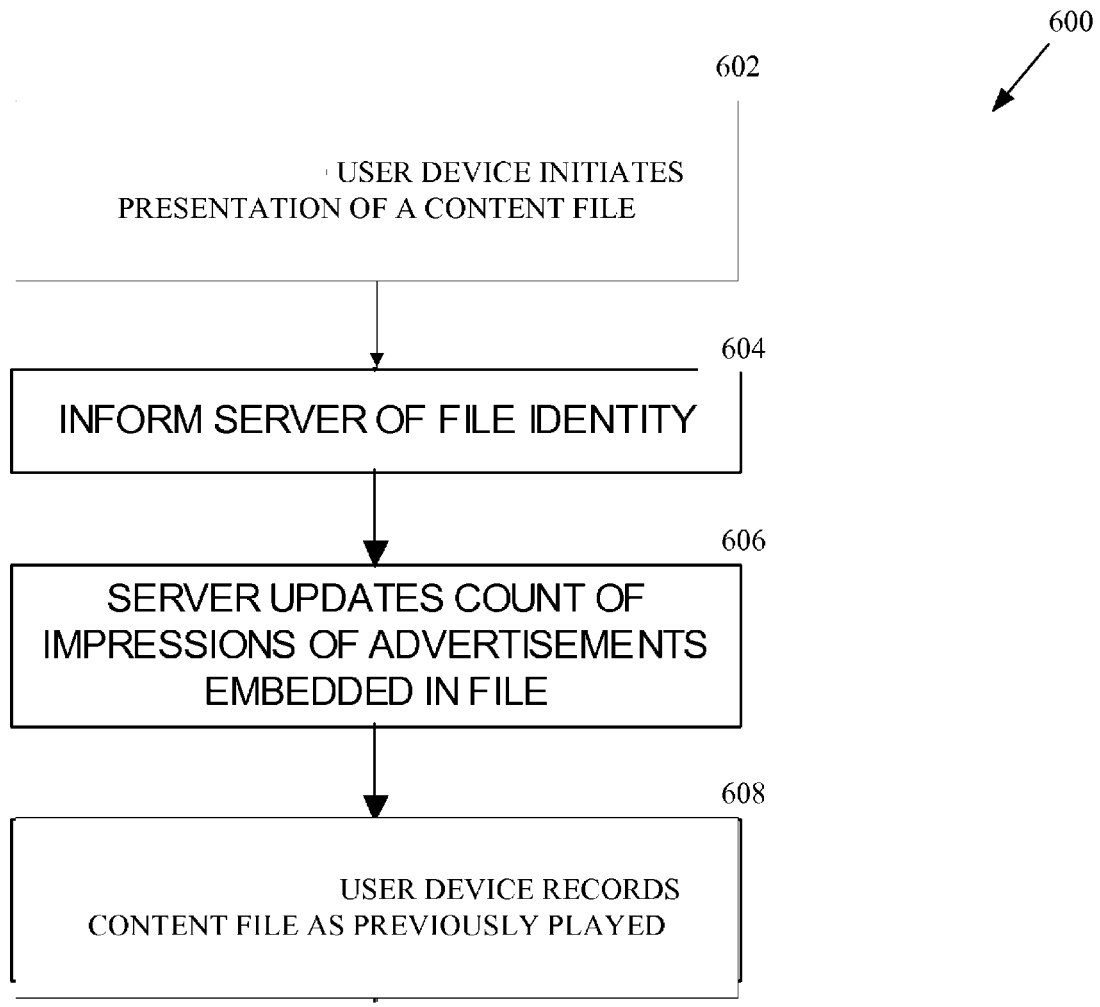

FIG. 5 shows an alternate embodiment process 600. At block 602, a user device initiates presentation of a content file. At block 604, the user device informs the server of the identity of the presented content file. At block 606, the server updates a count of impressions of advertisements embedded in or associated with the presented content file. At block 608, the user device records the content file as previously played. Thus, FIG. 5 shows a process for recording when a user plays an advertisement associated with a content file every time the content file is presented to the user. The recorded count is then used to set value for the advertisement.

While the preferred embodiment of the invention has been illustrated and described, as noted above, many changes can be made without departing from the spirit and scope of the invention. For example, the steps performed in the process described need not be in the exact order shown or need not include all the steps shown. Accordingly, the scope of the invention is not limited by the disclosure of the preferred embodiment. Instead, the invention should be determined entirely by reference to the claims that follow.

The invention claimed is:

1. A method comprising:
   receiving content on a mobile computing device, wherein the content includes an advertisement;
   storing the content in a memory;
   presenting the content on the mobile computing device;
   determining whether the content is being presented on the mobile computing device for a first time based on whether an indication that the content has been previously played on the mobile computing device is stored in the memory; and
   only if the content is being presented for the first time on the mobile computing device, providing, in response to the presentation of the content, an identifier to a server, wherein the identifier is used by the server to monitor exposure of the advertisement.

2. The method of claim 1, wherein the content is received from the server.

3. The method of claim 1, wherein the content is received from a second mobile computing device.

4. The method of claim 1, wherein the identifier is associated with the content.

5. The method of claim 1, wherein the identifier is associated with the advertisement such that the identifier is provided to the server based at least in part on presentation of the advertisement.

6. The method of claim 1, further comprising designating the content as previously presented based at least in part on the presentation of the content.

7. A mobile computing device comprising:
   a processor configured to present content, wherein the content includes an advertisement;
   a memory configured to store the content and to store an indication of whether the content has been previously played on the mobile computing device; and
   a radio component operatively coupled to the processor and configured to receive the content; and
   provide, in response to the presentation of the content, an identifier to a server, wherein the identifier is used by the server to monitor exposure of the advertisement;
   wherein the processor is further configured to determine if the content is being presented for a first time on the mobile computing device based on the indication, and the radio component is configured to provide the identifier to the server only if the content is being presented for the first time on the mobile computing device.

8. The mobile computing device of claim 7, wherein the content is received from the server.

9. The mobile computing device of claim 7, wherein the content is received from a second mobile computing device.

10. The mobile computing device of claim 7, wherein the identifier is associated with the advertisement such that the identifier is provided to the server based at least in part on presentation of the advertisement.

11. The mobile computing device of claim 7, wherein the radio component is further configured to provide the content to a second mobile computing device.

12. A method comprising: receiving a request for content from a mobile computing device;
   providing, in response to the request, the content to the mobile computing device, wherein the content includes an advertisement and the content is stored in a memory of the mobile computing device, wherein the memory is configured to store an indication of whether the content has been previously played on the mobile computing device;
   only if the content is being presented for the first time on the mobile computing device, receiving an identifier from the mobile computing device in response to a presentation of the content by the mobile computing device, wherein the identifier indicates whether the content is being presented on the mobile computing device for the first time; and
   using the identifier to monitor exposure of the advertisement.

13. The method claim 12, further comprising providing a digital content key to the mobile computing device such that the mobile computing device is able to present the content.

14. The method of claim 12, wherein using the identifier to monitor exposure of the advertisement comprises updating an advertisement impression count in response to receipt of the identifier.

15. The method of claim 14, wherein the advertisement impression count includes information associated with the mobile computing device.

16. The method of claim 15, wherein the information includes at least one of a location of the mobile computing device, a type of the mobile computing device, or account information associated with the mobile computing device.

17. The method of claim 12, further comprising receiving a second identifier from a second mobile computing device, wherein the second mobile computing device received the content from the mobile computing device.

18. A memory having computer-readable instructions stored thereon that, upon execution by a processor, cause a mobile computing device to:
   receive content, wherein the content includes an advertisement; store the content;
   present the content on the mobile computing device;
   provide, in response to the presentation of the content, an identifier to a server, wherein the identifier is used by the server to monitor exposure of the advertisement; and
   determine if the content is being presented for a first time on the mobile computing device based on whether an indication that the content has been previously played on the mobile computing device is stored in the memory, wherein the identifier is provided to the server only if the content is being presented for the first time on the mobile computing device.

19. The memory of claim 18, wherein the content is received from the server.

20. The memory of claim 18, wherein the content is received from a second mobile computing device.

21. The memory of claim 18, wherein the identifier is associated with the advertisement, and further wherein the computer-readable instructions cause the mobile computing device to provide the identifier to the server based at least in part on presentation of the advertisement.

22. The memory of claim 18, wherein the computer-readable instructions further cause the mobile computing device to designate the content as previously presented based at least in part on the presentation of the content.

* * * * *